(12) United States Patent
Chen et al.

(10) Patent No.: US 9,044,837 B2
(45) Date of Patent: Jun. 2, 2015

(54) TELESCOPIC SHAFT ASSEMBLY

(71) Applicant: INDUSTRIAL TECHNOLOGY RESEARCH INSTITUTE, Hsinchu (TW)

(72) Inventors: Shang-Te Chen, Taichung (TW); Hsi-Hung Hsiao, Taichung (TW); Bo-Tsun Chen, Taichung (TW); Shi-Jie Luo, Changhua (TW); Tzuo-Liang Luo, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 201 days.

(21) Appl. No.: 13/844,888

(22) Filed: Mar. 16, 2013

(65) Prior Publication Data
US 2014/0112701 A1 Apr. 24, 2014

(30) Foreign Application Priority Data
Oct. 19, 2012 (TW) .............................. 101138825 A

(51) Int. Cl.
*B23Q 5/32* (2006.01)
*B23Q 1/70* (2006.01)
*B66F 9/065* (2006.01)

(52) U.S. Cl.
CPC .............. *B23Q 5/326* (2013.01); *Y10T 403/32* (2015.01); *B66F 9/0655* (2013.01); *B23Q 1/70* (2013.01)

(58) Field of Classification Search
USPC .................................... 269/24, 27, 32, 95, 20
See application file for complete search history.

(56) References Cited

U.S. PATENT DOCUMENTS 222,972 A * 12/1879 White ........................... 408/137
4,253,709 A * 3/1981 Teramachi ...................... 384/45
4,296,974 A * 10/1981 Teramachi ...................... 384/45
(Continued)

FOREIGN PATENT DOCUMENTS

CN 102248406 A 11/2011
CN 102635567 A 8/2012
(Continued)

OTHER PUBLICATIONS

Mori Seiki Co Ltd., Announcing a new model in the NMV Series, ideal for small workpieces!, Mori Seiki The Machine Tool Company, 2009, pp. 1-4, Japan.
(Continued)

*Primary Examiner* — Lee D Wilson
*Assistant Examiner* — Alvin Grant
(74) *Attorney, Agent, or Firm* — Morris Manning & Martin LLP; Tim Tingkang Xia, Esq.

(57) ABSTRACT

A telescopic shaft assembly includes a seat, a shaft body disposed movably in the seat, and a plurality of slide blocks located between the shaft body and the seat. The shaft body has a convex portion and a recessed portion opposite to each other. One end of the convex portion far away from the recessed portion has a top surface. One of the plurality of slide block is disposed on the top surface. The recessed portion has two inner side wall surfaces opposite to each other and a bottom surface located between the two inner side wall surfaces. Each of the two inner side wall surfaces forms an obtuse angle with the bottom surface. Two of the rest of the plurality of slide blocks are disposed on the two inner side wall surfaces respectively.

9 Claims, 4 Drawing Sheets

(56) References Cited

U.S. PATENT DOCUMENTS

| | | | |
|---|---|---|---|
| 4,370,106 A | | 1/1983 | Lauterbach |
| 4,376,557 A | * | 3/1983 | Teramachi ............... 384/45 |
| 4,527,842 A | * | 7/1985 | Teramachi ............... 384/45 |
| 4,595,244 A | * | 6/1986 | Teramachi ............... 384/15 |
| 4,918,846 A | * | 4/1990 | Tsukada ............... 384/15 |
| 4,978,233 A | * | 12/1990 | Stotzel et al. ............... 384/12 |
| 5,275,492 A | * | 1/1994 | Shirai ............... 384/15 |
| 5,368,425 A | | 11/1994 | Mills et al. |
| 5,735,610 A | * | 4/1998 | Mark et al. ............... 384/42 |
| 6,161,995 A | * | 12/2000 | Wakazono et al. ............... 409/191 |
| 7,520,191 B2 | * | 4/2009 | Nagai et al. ............... 74/89.33 |
| 7,682,082 B2 | | 3/2010 | Kane et al. |
| 7,950,852 B2 | * | 5/2011 | Kondo ............... 384/15 |
| 8,043,007 B2 | * | 10/2011 | Rudy ............... 384/12 |
| 8,517,360 B2 | * | 8/2013 | Kawakami ............... 269/32 |

FOREIGN PATENT DOCUMENTS

| | | |
|---|---|---|
| GB | 1200251 A | 7/1970 |
| JP | 2006289511 A | 10/2006 |
| TW | M389606 | 10/2010 |

OTHER PUBLICATIONS

You Kan Chen et al., Static-Pressure Rail on Large-Scale Grinder, Shanghai Machine Tool Works, 1993, p. 56-58, vol. 4.

Hydrostatic PM Controller Contributes to Accuracy of Machining Operations and Machine Service Life, Hydrostatic System in Machine Tools, 2007, 240.110, Transatlantic Connection, Inc.

Mori NMV5000 DCG, machine design which offers outstanding operability, p. 1-7, Mori Seiki The Machine Tool Company.

Hydrostatic Slides, Hyprostatik Category, 2007, 240.310, Transatlantic Connection, Inc.

The New Force in Machining, Tiger-tec Silver.

"Office Action" issued by the Taiwan Intellectual Property Office, Ministry of Economic Affairs, R.O.C. on Nov. 5, 2014.

* cited by examiner

US 9,044,837 B2

TELESCOPIC SHAFT ASSEMBLY

CROSS-REFERENCE TO RELATED APPLICATIONS

This non-provisional application claims priority under 35 U.S.C. §119(a) on Patent Application No(s). 101138825 filed in Taiwan, R.O.C. on Oct. 19, 2012, the entire contents of which are hereby incorporated by reference.

TECHNICAL FIELD

The disclosure relates to a telescopic shaft assembly, and more particularly to a telescopic shaft assembly used in a machine tool.

BACKGROUND

In a processing machine, the stability of main shaft assembly is one of the key factors determining the processing precision and the completion degree. Generally, the shape of the main shaft in the main shaft assembly of the processing machine is a circular column or a rectangular column.

Taking a circular column shaped main shaft as an example, the ideal status is to keep the roundness of the cylindrical surface of the circular column shaped main shaft. However, to achieve such high processing precision, the manufacturing cost of the main shaft will be increased significantly. Taking a rectangular column shaped main shaft as an example, and comparing it with the circular column shaped main shaft, the rectangular column shaped main shaft has a poorer pressure dispersion performance, and therefore deformation is likely to occur on the column surface.

In addition, during the manufacturing process of the foregoing main shafts, it is unlikely to completely eliminate the tolerance. Furthermore, the amount of deformation generated when a force is applied to the circular or rectangular column shaped main shaft is large, so that the perpendicularity of the main shaft assembly is unsatisfactory, the centrality deviates, the precision of endpoint processing deviates, and even cutter vibration occurs, which results in an unsatisfactory completion degree of a processed object. Moreover, the foregoing situations also relatively shorten the service life of the main shaft and the cutting tool.

Therefore, how to reduce the amount of deformation when forces are applied to the main shaft, that is, how to improve the rigidity and bending resistance performance of the main shaft is a problem needs to be solved. Some manufacturers put forward the design of an octagonal column shaped main shaft to improve the bending resistance performance of the main shaft. Although the bending resistance performance of the octagonal column shaped main shaft is improved, but still not good enough to resist the bending.

SUMMARY

An embodiment of the disclosure provides a telescopic shaft assembly comprising a seat, a shaft body disposed movably in the seat, and a plurality of slide blocks located between the shaft body and the seat. The shaft body has a convex portion and a recessed portion opposite to each other. One end of the convex portion far away from the recessed portion has a top surface. One of the plurality of slide block is disposed on the top surface. The recessed portion has two inner side wall surfaces opposite to each other and a bottom surface located between the two inner side wall surfaces. Each of the two inner side wall surfaces forms an obtuse angle with the bottom surface. Two of the rest of the plurality of slide blocks are disposed on the two inner side wall surfaces respectively.

BRIEF DESCRIPTION OF THE DRAWINGS

The disclosure will become more fully understood from the detailed description given herein below for illustration only, and thus does not limit the disclosure, and wherein.

DETAILED DESCRIPTION

Figure 1:
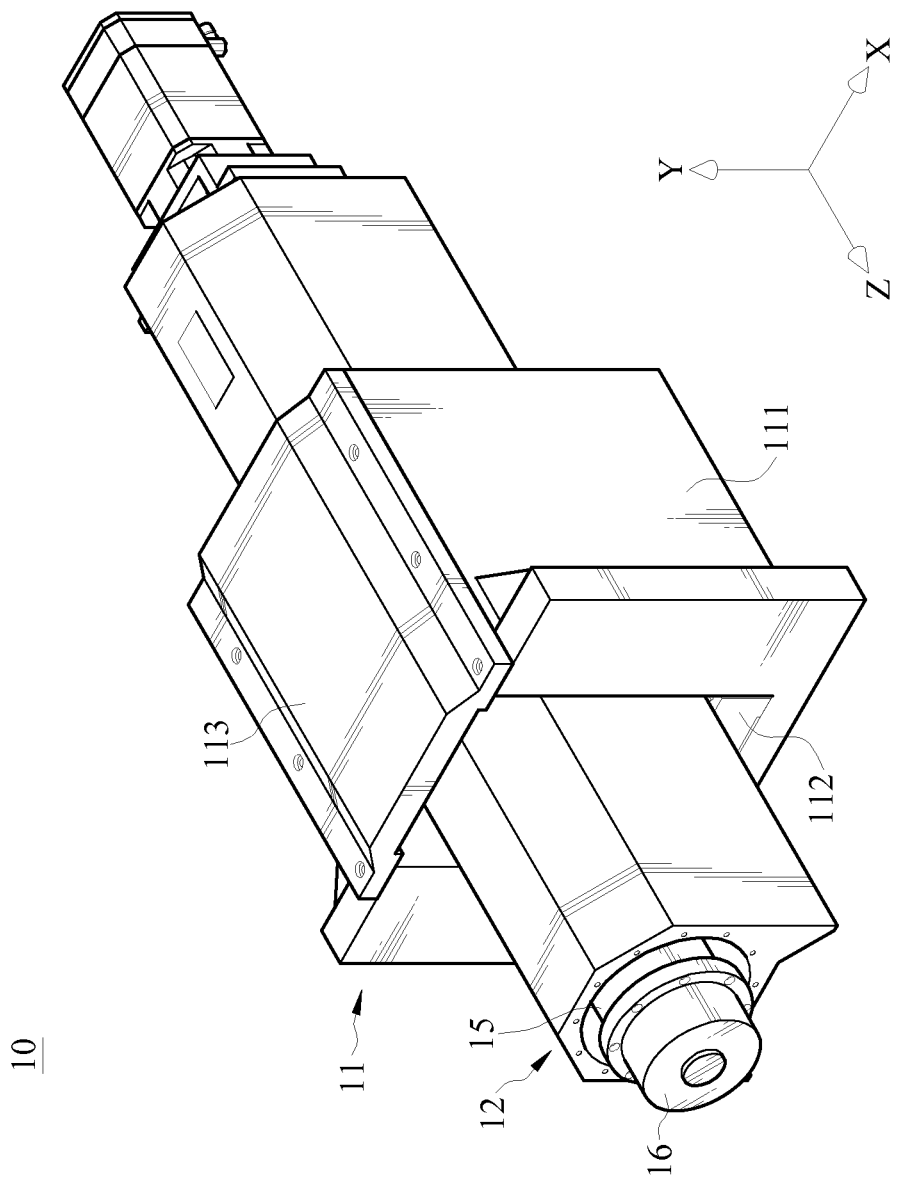
FIG. 1 is a schematic structural view of a telescopic shaft assembly according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
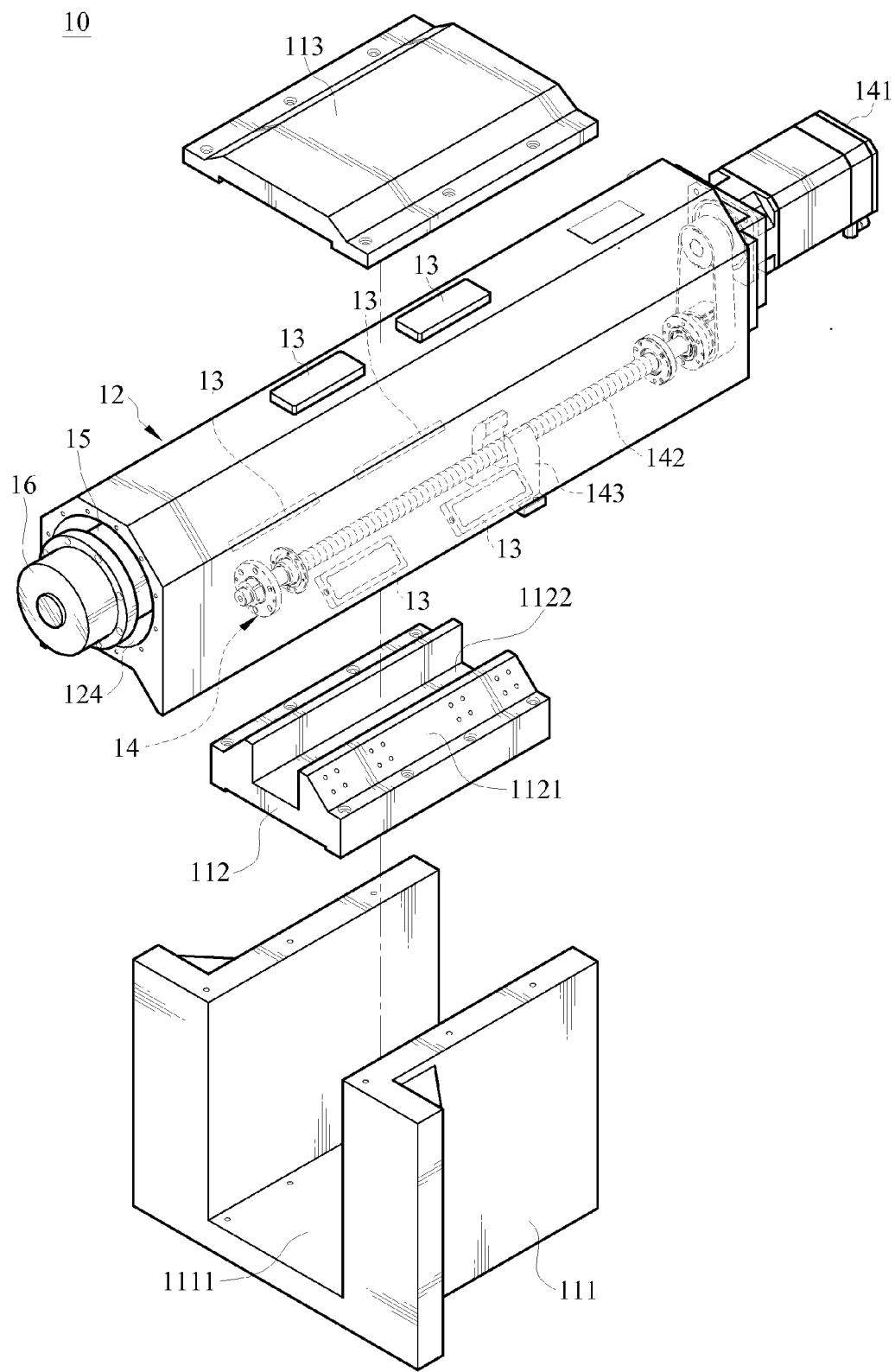
FIG. 2 is a schematic exploded view of a telescopic shaft assembly according to an embodiment of the disclosure.
Figure 3:
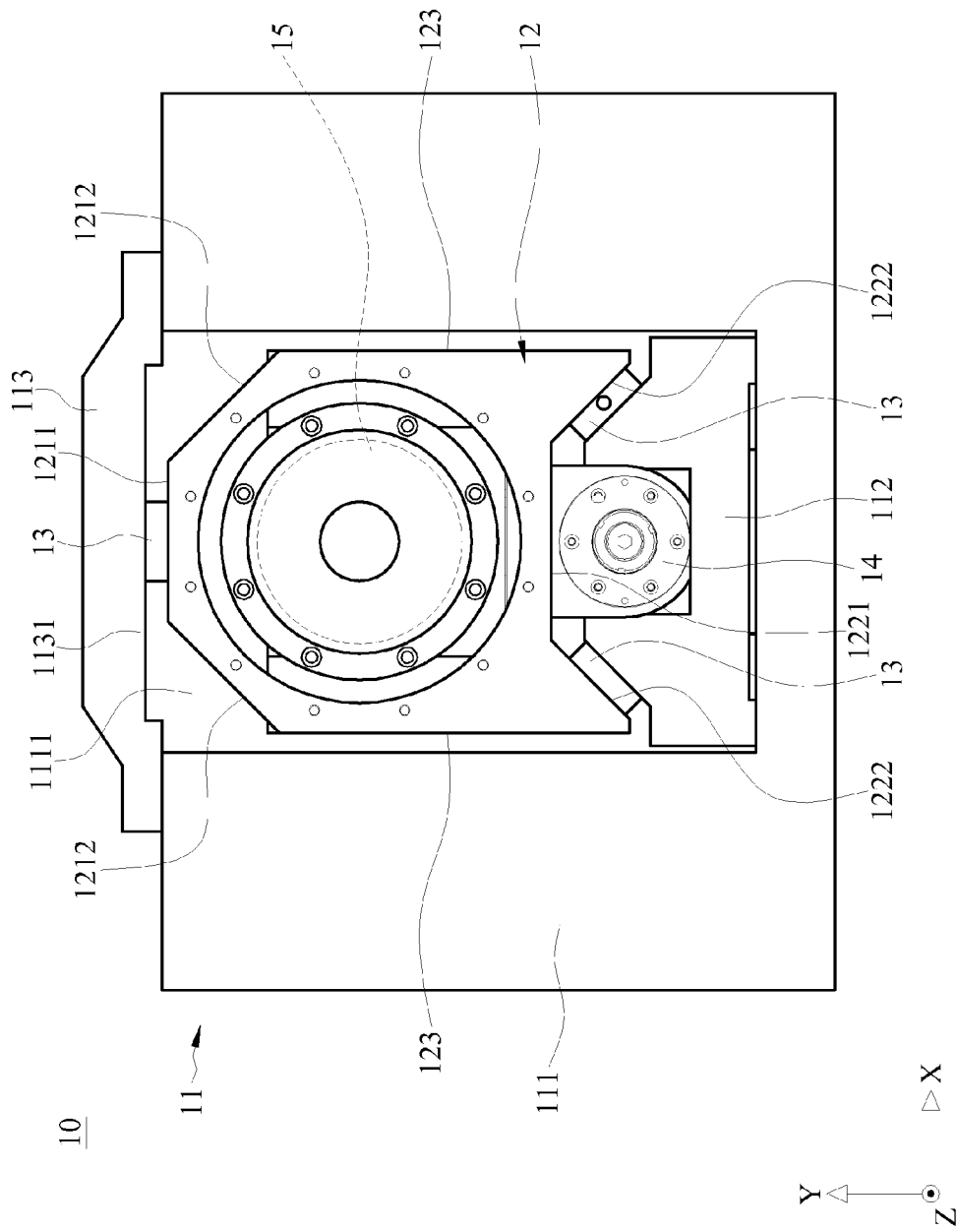
FIG. 3 is a structural side view of a telescopic shaft assembly according to an embodiment of the disclosure.
Figure 4:
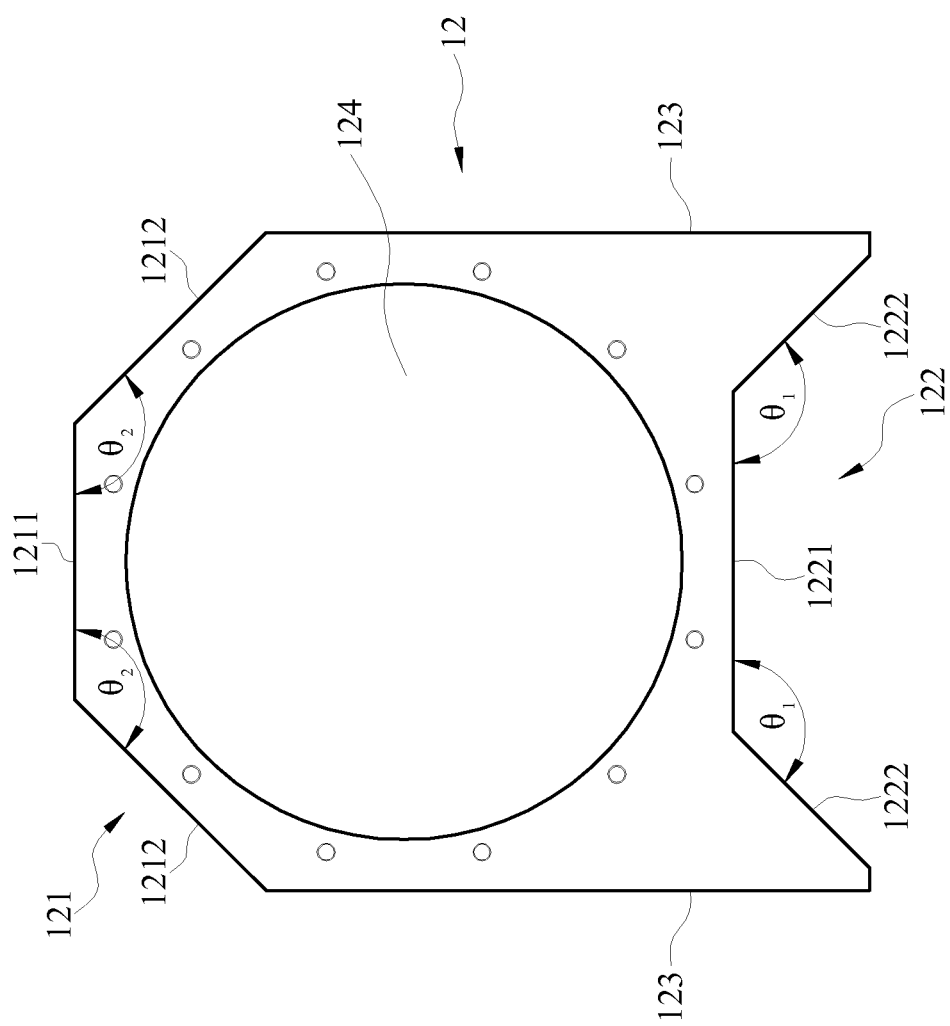
FIG. 4 is a structural side view of a shaft body according to an embodiment of the disclosure.

Referring to FIG. 1 to FIG. 4, FIG. 1 is a schematic structural view of a telescopic shaft assembly according to an embodiment of the disclosure; FIG. 2 is a schematic exploded view of a telescopic shaft assembly according to an embodiment of the disclosure; FIG. 3 is a structural side view of a telescopic shaft assembly according to an embodiment of the disclosure; and FIG. 4 is a structural side view of a shaft body according to an embodiment of the disclosure.

A telescopic shaft assembly 10 according to the disclosure comprises a seat 11, a shaft body 12, and a plurality of slide blocks 13.

The seat 11 comprises a casing 111, a slide rail 112, and a cover 113. The casing 111 has a penetration channel 1111, and the slide rail 112 is disposed in the penetration channel 1111. The slide rail 112 has a groove 1122 and two slide surfaces 1121 located on two opposite sides of the groove 1122. The cover 113 covers the penetration channel 1111, and the shaft body 12 is adapted to movably run through the penetration channel 1111 and is located between the cover 113 and the slide rail 112.

A transverse section of the shaft body 12 according to the disclosure is similar to the shape of the letter A. The shaft body 12 has a convex portion 121 and a recessed portion 122 opposite to each other (namely, disposed at two opposite sides of the shaft body 12).

The recessed portion 122 has two inner side wall surfaces 1222 opposite to each other and a bottom surface 1221 located between the two inner side wall surfaces 1222. In other words, the two inner side wall surfaces 1222 are connected to the two opposite ends of the bottom surface 1221. Furthermore, each of the inner side wall surfaces 1222 forms an included angle $\theta 1$ with the bottom surface 1221. The included angle $\theta 1$ is an obtuse angle, ranging from 135° to 165°.

One end of the convex portion 121, far away from the recessed portion 122, has a top surface 1211 as well as the top surface 1211 is substantially parallel to the bottom surface 1221. In addition, the convex portion 121 further has two outer side wall surfaces 1212 opposite to each other. The two outer side wall surfaces 1212 are connected to two opposite ends of the top surface 1211 respectively. Each of the outer side wall surfaces 1212 forms an included angle θ2 with the top surface 1211, and the included angle θ2 is an obtuse angle.

In addition, the shaft body 12 further has two side surfaces 123 opposite to each other, and the two side surfaces 123 are substantially parallel to each other. The two side surfaces 123 are connected to the two outer side wall surfaces 1212 of the convex portion 121 respectively, and extend from the convex portion 121 to the recessed portion 122. The two side surfaces 123 both are substantially perpendicular to the top surface 1211 as well as the bottom surface 1221.

In addition, in this embodiment, hydrostatic slide blocks are taken as an example to describe the slide blocks 13, but the disclosure is not limited thereto. The so-called hydrostatic slide block is a slide block in which an oil storage groove is disposed to store lubricating oil. When the slide block slides relative to the slide rail, an oil film is formed on a contact surface between the slide block and the slide rail, so that the friction between the slide block and the slide rail can be decreased significantly.

At least one of the slide blocks 13 is disposed and fixed on the top surface 1211 of the shaft body 12. The slide block 13 fixed on the top surface 1211 contacts a surface 1131 of the cover 113 which faces the slide rail 112. Also, the slide block 13 fixed on the top surface 1211 is capable of moving relative to the surface 1131 of the cover 113. Furthermore, the slide block 13 fixed on the top surface 1211 is located between the shaft body 12 and the cover 113. In this embodiment, the number of the slide blocks 13 disposed on the top surface 1211 of the shaft body 12 is 2 in this embodiment is exemplary, so the number of the slide blocks 13 disposed on the top surface 1211 of the shaft body 12 is not intended to limit the disclosure, and persons skilled in the art may make an adjustment according to actual requirements.

Furthermore, at least two of the rest of the slide blocks 13 are disposed on the two inner side wall surfaces 1222 of the shaft body 12 respectively. The two slide blocks 13 fixed on the two inner side wall surfaces 1222 contact the two opposite slide surfaces 1121 of the slide rail 112 respectively, and are capable of moving relative to the two slide surfaces 1121 of the slide rail 112. The slide blocks 13 fixed on the inner side wall surfaces 1222 are located between the shaft body 12 and the slide rail 112. In this embodiment, the number of the slide blocks 13 disposed on each inner side wall surface 1222 of the shaft body 12 is 2 is exemplary, so the number of the slide blocks 13 disposed on the inner side wall surface 1222 of the shaft body 12 is not intended to limit the disclosure, and persons skilled in the art may make an adjustment according to actual requirements.

In this embodiment, the two inner side wall surfaces 1222 and the top surface 1211 are mutually unparallel. Therefore, the shaft body 12 may be disposed on the seat 11 in a manner of limiting the degree of freedom in two axial directions, as long as the top surface 1211 and the two inner side wall surfaces 1222 are supported. Specifically, when the two slide blocks 13 fixed on the two inner side wall surfaces 1222 contact the two opposite slide surfaces 1121 of the slide rail 112 respectively, the positive X-axis movement direction, the negative X-axis movement direction, and the negative Y-axis movement direction of the shaft body 12 are limited by the slide rail 112. When the slide block 13 fixed on the top surface 1211 contacts the surface 1131 of the cover 113, the Y-axis movement direction of the shaft body 12 is limited by the cover 113. Through the shape design of the shaft body 12 according to this embodiment, the seat 11 is enabled to support the shaft body 12 as long as the three slide blocks 13 are disposed between the shaft body 12 and the seat 11, and the shaft body 12 has only one axial movement direction (Z-axis direction). Therefore, the number of the slide blocks 13 used in the telescopic shaft assembly 10 of this embodiment is reduced compared with that in the prior art.

In addition, in this embodiment and some other embodiments, the telescopic shaft assembly 10 further comprises a feed module 14. The feed module 14 is connected to the slide rail 112 of the seat 11 as well as the shaft body 12. Furthermore, in this embodiment and some other embodiments, the feed module 14 comprises a drive 141, a lead screw 142, and a driving block 143. In this embodiment and some embodiments, the drive 141 is a motor. The drive 141 is disposed at one end of the shaft body 12. In this embodiment and some other embodiments, the lead screw 142 is connected to the drive 141 by a driving belt so that the drive 141 is capable of driving the lead screw 142 to rotate. The driving block 143 is fixed in the groove 1122 of the slide rail 112 of the seat 11, and the lead screw 142 extends through the driving block 143. The drive 141 drives the lead screw 142 to rotate and move relative to the driving block 143, so as to propel the shaft body 12 to move relative to the seat 11 along the positive Z-axis direction or the negative Z-axis direction in a telescopic manner.

In addition, in this embodiment and some other embodiments, the shaft body 12 further has a through hole 124 where a rotary shaft 15 runs through. In this embodiment and some other embodiments, the telescopic shaft assembly 10 further comprises a shaft head 16 disposed at one end of the shaft body 12, and the shaft head 16 is connected to the rotary shaft 15. By disposing various types of shaft heads 16 at one end of the shaft body 12, the telescopic shaft assembly 10 of this embodiment and some other embodiments is applicable to a combined turning and milling machine, a horizontal machining device, a gantry machining device or a five-axis machining device, but the disclosure is not limited thereto.

The following table is a comparison table of strain data of the shaft body according to the disclosure and a conventional shaft body obtained through simulation by using the simulation software ansys 12.0 under the same conditions.

The simulation is performed on the shaft body of the disclosure through two embodiments in which θ1 is equal to 135° and 165° respectively. For parameter settings, the shaft body according to two embodiments of the disclosure has the length of 1,400 mm and the mass of 336 kg, and the conventional octagonal column shaped shaft body and the conventional tetragonal column shaped shaft body have the same length and mass as those of the shaft body according to two embodiments of the disclosure.

For the deformation caused by bending moment, the amount of deformation of each shaft body is obtained through simulation with boundary conditions being that an external force of 5,000 newtons is applied to an end edge, 670 mm away from a fixed end of each shaft body. As seen from the following table, under the same force, the amounts of forced deformation of the shaft body, according to two embodiments of the disclosure, are both smaller than those of the conventional octagonal column shaped shaft body and the conventional tetragonal column shaped shaft body, which indicates that the bending resistance performance of the shaft body 12, according to the disclosure, is superior to that of the conventional octagonal column shaped shaft body and the conventional tetragonal column shaped shaft body. When the included angle θ1 between the inner side wall surface 1222 and the bottom surface 1221 is 135°, the shaft body 12 has a better bending resistance performance.

For the amount of thermal strain, simulation is performed on the amount of thermal strain of each shaft body when the temperature is increased by 5° C. As seen from Table-1, with the temperature being raised in the same conditions, the amounts of thermal strain of the shaft body according to two embodiments of the disclosure are substantially equal to those of the conventional octagonal column shaped shaft body and the conventional tetragonal column shaped shaft body, which indicates that the structure of the shaft body 12 according to the disclosure has the thermal strain resistance performance of a certain level.

TABLE 1

|  | Shaft body of the disclosure ($\theta1 = 135°$) | Shaft body of the disclosure ($\theta1 = 165°$) | Conventional octagonal column shaped shaft body | Conventional tetragonal column shaped shaft body |
| --- | --- | --- | --- | --- |
| Deformation caused by forced bending moment | 0.025 mm | 0.027 mm | 0.028 mm | 0.029 mm |
| Amount of thermal strain | 0.001 mm | 0.001 mm | 0.001 mm | 0.001 mm |

In the telescopic shaft assembly according to the foregoing embodiment, the shaft body has a convex portion and a recessed portion opposite to each other. The two inner side wall surfaces of the recessed portion form an obtuse angle with the bottom surface, which enables the shaft body to have better bending resistance. Furthermore, the structural design of the shaft body according to this embodiment can reduce the number of the slide blocks to be used, so as to reduce the cost of the telescopic shaft assembly. In addition, by disposing various types of shaft head structures at one end of the shaft body, the telescopic shaft assembly, according to this embodiment, may be used in various kinds of machining devices such as a combined turning and milling machine, a horizontal machining device, a gantry machining device or a five-axis machining device.

What is claimed is:

1. A telescopic shaft assembly, comprising:
 a seat;
 a shaft body disposed movably in the seat, the shaft body having a convex portion and a recessed portion opposite to each other, one end of the convex portion far away from the recessed portion having a top surface, the recessed portion having two inner side wall surfaces opposite to each other and a bottom surface located between the two inner side wall surfaces, and wherein each of the two inner side wall surfaces forms an obtuse angle with the bottom surface; and
 a plurality of slide blocks located between the shaft body and the seat, wherein one of the plurality of slide blocks is disposed on the top surface, two of the rest of the plurality of slide blocks are disposed on the two inner side wall surfaces respectively, and each of the plurality of slide blocks is a hydrostatic slide block.

2. The telescopic shaft assembly according to claim 1, wherein an included angle formed between any one of the two inner side wall surfaces and the bottom surface ranges from 135° to 165°.

3. The telescopic shaft assembly according to claim 1, wherein the top surface is substantially parallel to the bottom surface.

4. The telescopic shaft assembly according to claim 1, wherein the convex portion has two outer side wall surfaces opposite to each other, and each of the two outer side wall surfaces forms an obtuse angle with the top surface.

5. The telescopic shaft assembly according to claim 1, wherein the shaft body has two side surfaces opposite to each other, the two side surfaces extend from the convex portion to the recessed portion, and the two side surfaces are substantially perpendicular to the top surface and the bottom surface.

6. The telescopic shaft assembly according to claim 1, wherein the shaft body has a through hole for being run through by a rotary shaft.

7. The telescopic shaft assembly according to claim 1, further comprising a shaft head disposed at one end of the shaft body.

8. The telescopic shaft assembly according to claim 1, wherein the seat further comprises a casing, a slide rail and a cover, the casing has a penetration channel, the slide rail is disposed in the penetration channel, the cover covers the penetration channel, the shaft body runs through the penetration channel, the two slide blocks located on the two inner side wall surfaces movably contact the slide rail, and the slide block located on the top surface movably contact the cover.

9. The telescopic shaft assembly according to claim 1, further comprising a feed module connected to the seat and the shaft body.

* * * * *